(No Model.)

R. T. P. ALLEN.
CAR STARTER.

No. 351,559. Patented Oct. 26, 1886.

WITNESSES:
Fred G. Dieterich
Solon C. Kemon

INVENTOR:
R. T. P. Allen
BY Munn & Co.
ATTORNEYS.

UNITED STATES PATENT OFFICE.

ROBERT T. P. ALLEN, OF FARMDALE, KENTUCKY.

CAR-STARTER.

SPECIFICATION forming part of Letters Patent No. 351,559, dated October 26, 1886.

Application filed July 29, 1886. Serial No. 209,482. (No model.)

*To all whom it may concern:*

Be it known that I, ROBERT T. P. ALLEN, of Farmdale, in the county of Franklin and State of Kentucky, have invented a new and useful Improvement in Car-Starters, of which the following is a specification.

My invention consists in an improved car-starter, which will be hereinafter fully described and claimed.

Figure 1:
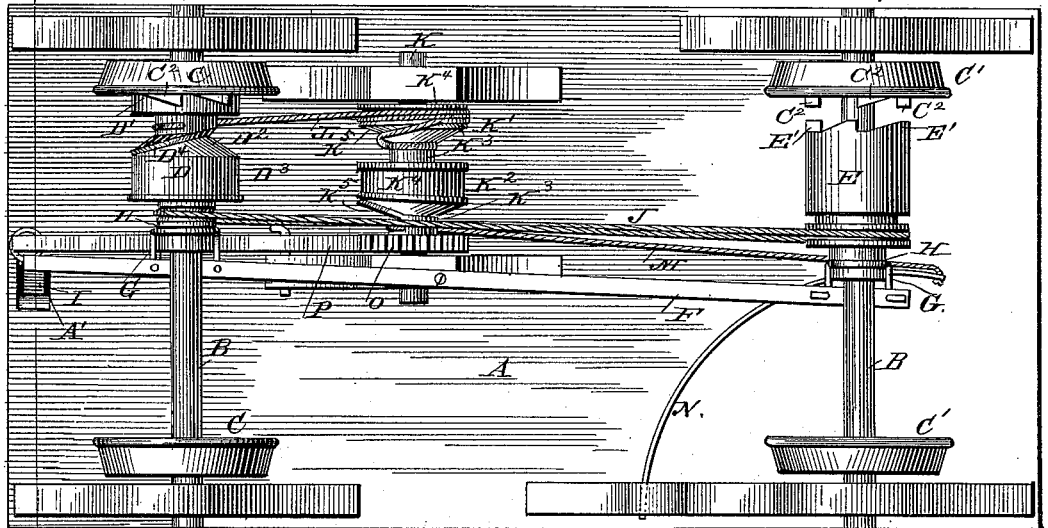
Figure 2:
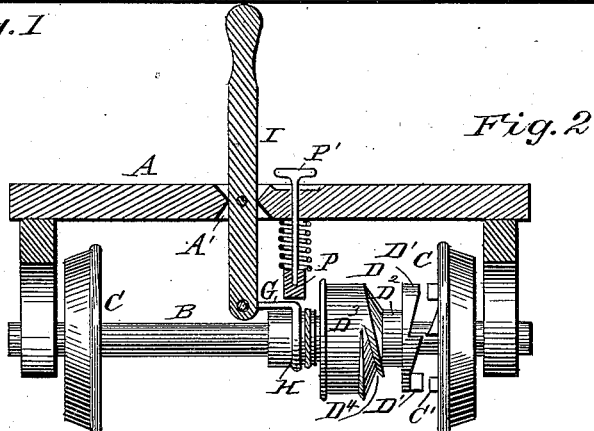
Figure 3:
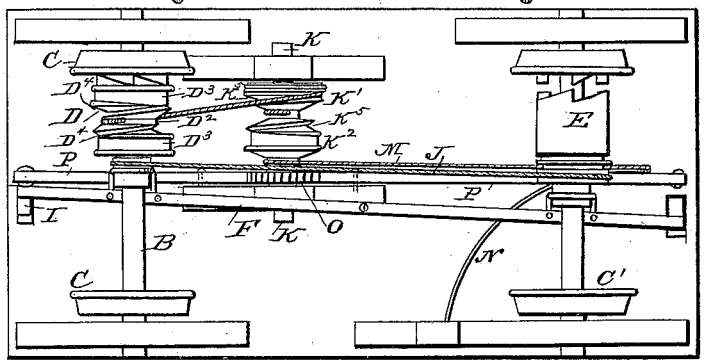

Referring to the accompanying drawings, Figure 1 is an inverted plan view. Fig. 2 is a transverse section in line $x\ x$ of Fig. 1. Fig. 3 is an inverted plan view showing a modification of my invention.

The same letters of reference indicate corresponding parts in all the figures.

Referring to the several parts by letter, A represents the platform of an ordinary street-car; B B, the axles, and C C' the front and rear wheels, respectively. The inner face of both the front and rear left-hand car-wheels is provided with the cogs $C^2$; or a collar formed with cogs may be secured on each axle at that point. On each axle is loosely mounted a drum, D E, each of which is formed at one end with cogs D' E', adapted to engage with the cogs on the car-wheels when moved in that direction by the main lever F. This lever F is centrally pivoted to a bearing on the bottom of the platform A, and is provided near each end with the curved rods G, which fit in annular grooves H in the outer ends of the two drums D E. The forward end of this lever is connected to the lower end of a vertical centrally-pivoted hand-lever, I, which is pivoted in a transverse slot, A', in the forward end of the platform. The drum on the forward axle is formed with the reduced portion $D^2$ and the enlarged portion $D^3$, the said portions being connected by the spiral groove $D^4$. A wire rope or chain, J, passes around groove in the drums on the front and rear axles, being turned or twisted in its center, as shown, between the two drums.

K represents a short transverse axle secured in bearings between the main axles, and having secured on it two drums, K' $K^2$, formed with the reduced and enlarged portions $K^3$ $K^4$, connected by the spiral grooves $K^5$, and a wire rope or chain, L, is secured to and wound around the drum K', and secured at its other end to the reduced portion of the loose drum on the front axle, while to the reduced portion of the drum $K^2$ is secured one end of a rope or chain, M, the rear end of which is secured to the free end of the curved leaf-spring N. The short transverse axle K is also provided with a ratchet-wheel, O, with which a spring-actuated pawl, P, may be thrown into or out of engagement, being controlled by a pedal, P', under the foot of the driver.

The operation is as follows: When the driver is about to stop the car, he moves the upper end of the hand-lever I to the right, thus moving the drum D on the front axle so that its cogs mesh with the cogs on the drive-wheel C, when the drum is revolved and winds around it the rope L, thereby revolving the short axle K and winding around the drum $K^2$ the rope connected with the spring, thus bringing the tension of the spring into play, storing up the force represented by the momentum of the car. The spring-actuated pawl engaging with the ratchet-wheel holds the spring in its stretched position. To start the car, the driver moves the hand-lever to the left, thus disengaging the cogs of the front drum and engaging the cogs of the rear drum with the cogs of the rear drive-wheel, C', and the driver then presses with his foot upon the pedal P', thereby freeing the pawl P from the ratchet-wheel, when the force of the spring will revolve the short shaft K, thereby revolving the loose front drum, D, and, through it and the crossed rope J, revolving the rear drum and drive-wheels in the opposite direction, thus starting the car.

It will be seen that by constructing the drums with the smaller and larger parts connected by the spiral grooves, as shown and described, that the force stored up in the spring is exerted with the greatest leverage at the moment when the spring first comes into play to start the car. It will be seen that when the spring is free from tension the rope M connects it with the smallest part of the drum $K^2$, while when the spring is stretched to bring its tension into play the rope is wound around the largest part of its drum, and thus acts with greatly-increased leverage. As the power passes from the short axle to the forward drum the leverage is greatly increased, and also in passing from the forward drum to the rear one, as the grooved portion of the rear drum, around which the twisted rope J is wound, is several times larger than the corresponding grooved portion of the forward drum; and by this construction and arrangement of parts the force of the spring is greatly multiplied at the instant of starting.

The middle shaft and drums may be dispensed with, if desired, and the rope from the spring connected directly with the loose drum on the front axle, the object of the middle drum being merely to increase the leverage, and may be employed or not, as thought desirable.

Instead of the ratchet-wheel and pawl shown, a friction roller and brake may be substituted, and suitable friction-clutches may be employed instead of the cogs, to engage the loose drums with the drive-wheels.

For cars which do not turn at the end of the line, the slightly-different construction shown in Fig. 3 is employed, in which the main lever F is extended at both ends, and connected at each end to a vertical hand-lever, I, the drums on the front and middle axles being made double, with double spiral grooves, as shown.

Having thus described my invention, what I claim as new, and desire to secure by Letters Patent, is—

1. The combination of the centrally-pivoted main lever, the hand-lever, the drive-wheels having the cogged inner faces, the drums loosely mounted on the axles and formed at one end with the cogs, the twisted rope or chain, the spring, and the connecting rope or chain.

2. The combination of the centrally-pivoted main lever, the hand-lever, the drive-wheels having the cogged inner faces, the loosely-mounted drums having the cogs at one end and formed with the reduced and enlarged portions connected by the spiral grooves, the middle axle having the drums formed with the reduced and enlarged portions connected by the spiral grooves, the ratchet-wheel, and the spring-actuated pawl having the foot-pedal, the spring, the ropes or chains connecting the spring, and the middle and forward drums, as described, and the twisted rope or chain connecting the loosely-mounted drums together, all constructed, arranged, and combined substantially in the manner and for the purpose herein set forth.

ROBERT T. P. ALLEN.

Witnesses:
 JNO. T. GRAY,
 J. H. GRAY.